Figure 1:
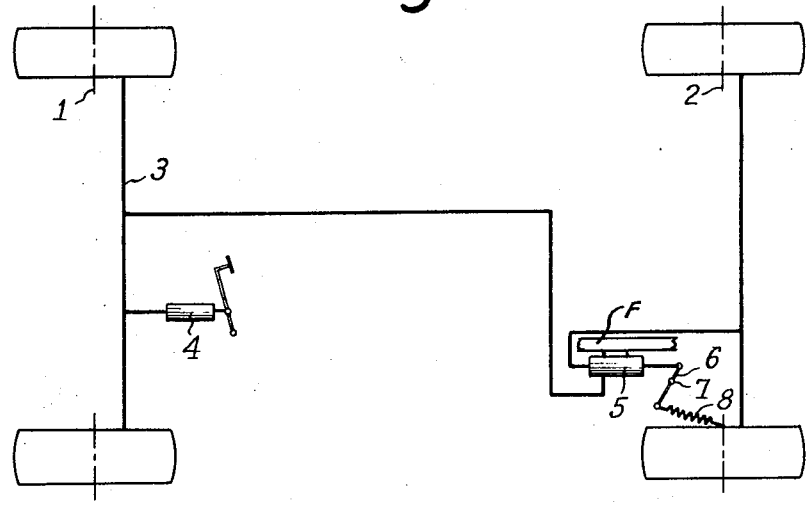

Oct. 20, 1964   E. HENRY-BIABAUD   3,153,560
LOAD-RESPONSIVE HYDRAULIC BRAKING SYSTEM
Filed Jan. 23, 1962

United States Patent Office 3,153,560
Patented Oct. 20, 1964

3,153,560
LOAD-RESPONSIVE HYDRAULIC
BRAKING SYSTEM
Edmond Henry-Biabaud, Paris, France, assignor to Societe
Anonyme Andre Citroen, Paris, France, a French
company
Filed Jan. 23, 1962, Ser. No. 168,173
Claims priority, application France, Jan. 24, 1961,
850,551
3 Claims. (Cl. 303—22)

The present invention relates to hydraulic vehicle braking systems, and has for an object, improvements therein.

The load carried by a vehicle is not equally distributed between the front and rear axles and the distribution ratio varies with the load. Consequently, difficulties arise in obtaining a balanced braking of the vehicle, and there is the risk that a loss of road-adhesion will occur with consequent skidding if the discrepancy between the loads on the front and rear axles is too great.

The maximum braking pressure for the load effectively supported by the wheel is substantially proportional to the tire-ground adhesion under the conditions prevailing at the time.

Variation in the maximum braking pressure as a function of the tire-ground adhesion is therefore more or less linear, for a given load distribution. But, upon braking, there is a transfer of load from the rear wheels to the front wheels, which increases in relation to the static load proportionally to the increase in the possible deceleration i.e. the adhesion.

The above representation, which was linear for each axle of the vehicle is therefore—always as a function of the adhesion—a combination of two curves; one for the front axle which rises for higher pressures, the other for the rear axle which falls for lower pressures.

Consequently, in order that the driver may apply the maximum braking compatible with the state of the ground, it is necessary that the rear brakes be less heavily applied in relation to the front brakes, as the braking intensity goes up.

The present invention has for an object a hydraulic braking system designed with this object in view.

A hydraulic vehicle braking system according to the invention comprises a pressure feed regulator arranged in the braking circuit for the wheels of one of the axles, for example the rear axle, between the brake cylinders and the master cylinder, so as to feed the brake cylinders with a pressure more or less below that supplied by the master cylinder, and means for operating the feed regulator as a function of the load on the axle, and wherein the pressure feed regulator comprises a differential valve submitted to the pressure of the master cylinder and to that obtaining in the brake cylinders, the first pressure acting on the valve in the direction corresponding to its opening and the second in the opposite direction, and means for exercising an auxiliary force on this valve, which auxiliary force is dependent upon the loading of the axle and acts on said valve in the direction corresponding to its opening, the area of the valve against which the pressure of the master cylinder acts being less than that against which the pressure of the brake cylinders act, so that these pressures exercise a differential action on the valve which is balanced by the auxiliary force applied to the valve.

In an advantageous embodiment of the invention, the pressure feed regulator further includes a by-pass around the differential valve between the master cylinder and the brake cylinders, with a check-valve in the by-pass which opens when the pressure of the brake cylinders exceeds that of the master cylinder thereby to permit return of the braking fluid from the brake cylinders to the master cylinder upon release of the brakes.

Figure 2:
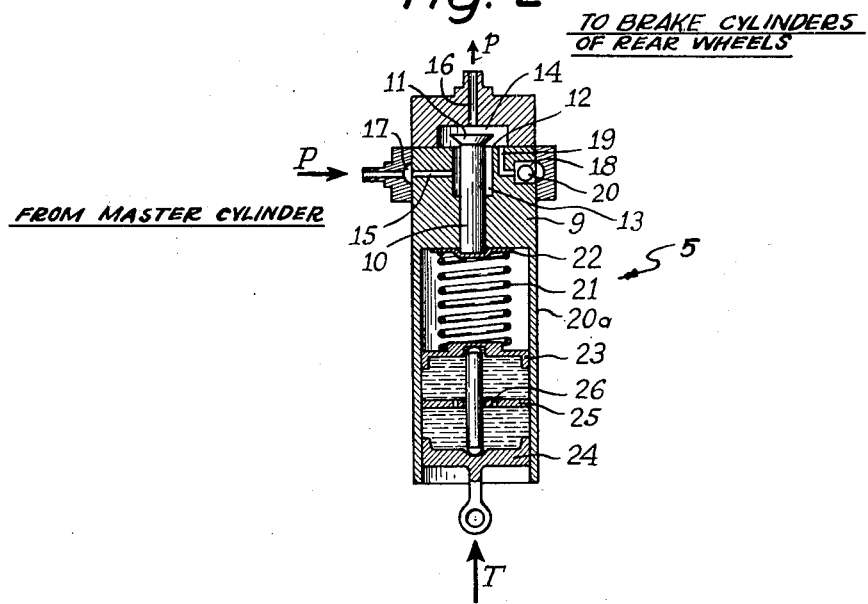

In order that the invention may be more clearly understood, reference will now be made to the accompanying drawing which shows one embodiment thereof by way of example and in which:

FIGURE 1 is a diagram of a braking system having a pressure feed regulator interposed therein in accordance with this invention, and FIGURE 2 is an enlarged axial sectional view of the pressure feed regulator.

Referring to FIG. 1 of the drawing, the front axle of an automobile is shown at 1, and the rear axle at 2, it being assumed that this axle is of the variable load type.

The brake cylinders of the brakes of the front wheels of axle 1 are directly supplied with brake fluid by a pipe 3 from a master cylinder 4. However, the brake cylinders of the brakes of the rear wheels mounted on axle 2 are supplied with brake fluid through a pressure regulator 5. The regulator 5 mounted on the frame or chassis of the vehicle, of which a portion is schematically represented at F, is controlled, in dependance upon the deflection of the suspension of rear axle 2, through a lever 6 which is pivotally mounted at 7 on the chassis and connected by a spring 8 to the rear axle.

As is shown in FIGURE 2, the feed regulator 5 includes a valve housing or casing member 9 in which rod 10 of a valve 11 is slidably mounted. The valve 11 is adapted to rest against a circular seat 12 thereby separating two chambers 13 and 14 provided in the member 9. A conduit 15 connected to the master cylinder 4 opens into chamber 13; and a conduit 16 connected to the braking cylinders of axle 2 opens into chamber 14.

An annular groove 17 communicates, on the one hand, with conduit 15 and, on the other hand, with a chamber 18. A by-pass or return conduit 19 extends between chamber 14 and chamber 18, and a ball or check valve 20 is disposed in chamber 18 and is adapted to close the conduit 19 when the pressure in chamber 18 is above that in chamber 14.

Formed as an extension of member 9 is a cylinder or sleeve 20a in which is located a spring 21. The spring 21 is interposed between a shaped washer 22 which rests against the extremity of the valve rod 10, and a piston 23. The piston 23 constitutes, in combination with a second piston 24 connected to the lever 6 and a fixed plate 25 perforated by orifices 26, a dashpot intended to limit the oscillation effects of the suspension for the rear axle around the static position which is determined by the load carried by such axle.

It is thus seen that the valve 11 is submitted to the action of pressure $p_1$ in the pipes of the rear braking cylinders, to that of pressure $P_1$ in the master cylinder, and to a force T substantially proportional to the rear load $C_2$, so that one can say that, approximately, load $T = hC_2$.

In order to explain the functioning of the feed regulator, the following references will hereinafter be used:

S—the area of valve 11, the surface of which rests on seat 12, and which is exposed to the pressure $p_1$;
s—the area of rod 10 in chamber 13 so that the area of the valve exposed to the pressure $P_1$ is $S-s$;
$K_m$—the maximum ratio between the front braking pressure and load $C_1$ on the front wheels for adhesion conditions obtaining at the time, thus making it possible to write: $P_{max} = K_m C_1$
$H_m$—the maximum ratio between the rear braking pressure and the load $C_2$ on the rear wheels under the same adhesion conditions.

It is the intention that $p_{max}$ shall not exceed $H_m C_2$.

When no pressure is exerted on the braking fluid, the feed regulator is in the position shown in FIGURE 2, i.e. valve 11 is open. When the fluid begins to pass into the rear braking cylinders, the valve remains open and pressures $p_i$ and $P_i$ are equal.

The valve closes when pressure $P_i$ reaches value $P_0$ such that:

$$P_0 s = T = h C_2$$

From the moment that the valve 11 rests on its seat, pressure $P_i$ in chamber 13 becomes greater than pressure $p_i$; the ball 20 comes up against the aperture of conduit 19 and seals it. When the above balance is disturbed, valve 11 is lifted and a little fluid once more passes into chamber 14; whereupon the valve 11 once more returns to its seat. The condition of balance is defined by the relation:

$$p_i S = h C_2 + P_i (S - s)$$

or $$p_i = \frac{h}{S} C_2 + P_i \frac{(S-s)}{S} \qquad (1)$$

Now, if, statically, one has: $P_{max} = K_m C_1$
(for a given adhesion): $P_{max} = H_m C_2$ during braking these values become:

$$P_{max} = K_m (C_1 + \pi)$$
$$P_{max} = H_m (C_2 - \pi)$$

$\pi$ being the load ratio to the front, the Expression 1 is then written as:

$$p_i = \frac{h}{S}(C_2 - \pi) + \frac{S-s}{S} K_m (C_1 + \pi) \qquad (2)$$

This value should remain below $H_m(C_2 - \pi)$.

Practically speaking, the problem can be solved approximately by determining for two loads giving extreme values of $C_1$ and $C_2$, for example, empty and loaded conditions, corresponding equations which make it possible, by supposing as fixed factors $s$, K and H, to determine S and $h$ or, conversely, from the data which one determines for oneself.

It is seen that the distribution increases the rear load $C_2$ for the first term of the value of $p_i$ (Expression 2), this increase being corrected by the transfer of the load to the front during braking.

The second term of this relationship may be maintained at a low value which is easy if $s$ and $S$ are close to one another.

The only limitation with respect to the relative values of $s$ and $S$ is the necessity of having sufficient differential pressure for the correct operation of the device.

Upon release of the brakes, pressure $P_i$ drops below pressure $p_i$ so that the ball 20 is unseated, thereby allowing the fluid to return to the master cylinder through conduit 16, by-pass 19, chamber 18 and groove 17.

It will be apparent that the invention is not limited to the embodiment described and illustrated and that the specific details referred to may be modified as desired. Thus, in particular, the transmission of the load to the feed regulator can be carried out so that the compression T of spring 21 is any desired function of the load.

I claim:

1. A pressure feed regulator for varying the maximum pressure of hydraulic fluid admitted from the master cylinder of an hydraulic braking system to the brake cylinders associated with one of the axles of an automotive vehicle in accordance with the load on that axle; said pressure feed regulator comprising a valve housing having first and second conduits adapted for connection to the master cylinder and to the associated brake cylinders, respectively, and defining a valve seat between said first and second conduits; a valve member movable in said housing between a closed position against said seat and an open position spaced from said seat, said valve member having a relatively small first area exposed to the pressure from the master cylinder acting in said first conduit for urging the valve member toward said open position and a relatively large second area exposed through said second conduit to the pressure acting in the brake cylinders for urging said valve member toward said closed position; means for exerting an auxiliary force on said valve member dependent upon the load on said one axle and tending to move said valve member toward said open position so that the pressures from the master cylinder and acting in the brake cylinders, respectively, have a differential action on said valve member which is variably balanced by said auxiliary force; means defining a by-pass around said seat between said first and second conduits; and check valve means in said by-pass operative to close said by-pass, when the pressure in said first conduit is greater than the pressure in said second conduit, and to open said by-pass, when the pressure in said second conduit is greater than the pressure in said first conduit, thereby to permit return of fluid from the brake cylinders to the master cylinder upon release of the brakes.

2. A pressure feed regulator as in claim 1; wherein said means for exerting an auxiliary force on the valve member includes means defining a cylinder with a first piston slidable therein, a compression spring interposed between said valve member and said first piston, a second piston slidable in said cylinder and adapted to be connected to the axle for movement in response to changes in the loading thereof, said cylinder containing liquid between said first and second pistons for transmitting movement of the second piston to the first piston, and a perforated plate fixed in said cylinder between said pistons for damping oscillations of the pistons.

3. A pressure feed regulator as in claim 1; wherein said valve housing has coaxial, communicating first and second cavities of relatively small and large diameters, respectively, with said valve seat being located at the opening of said first cavity into said second cavity and with said first and second conduits opening into said first and second cavities, respectively, said valve member has a stem slidable in said housing and extending through said first cavity with clearance therebetween and an enlarged head on an end of said stem within said second cavity to engage said seat in said closed position, said second area of the valve member being defined by the side of said head facing away from said stem and said first area of the valve member being defined by the side of said head facing toward said stem and projecting laterally beyond the stem; and
wherein said means defining a by-pass includes an auxiliary cavity in said housing, an annulus on said housing defining a passage between said first conduit and said auxiliary cavity, and a bore of relatively small cross-section extending from said second cavity into said auxiliary cavity, and said check valve means includes a ball in said auxiliary cavity adapted to seat against the opening of said bore in the auxiliary cavity.

References Cited in the file of this patent

UNITED STATES PATENTS

| | | |
|---|---|---|
| 2,270,366 | Wolf | Jan. 20, 1942 |
| 2,424,913 | Browall | July 29, 1947 |
| 2,579,334 | Plank | Dec. 18, 1951 |
| 2,991,801 | Larsson | July 11, 1961 |

FOREIGN PATENTS

| | | |
|---|---|---|
| 121,292 | Russia | Sept. 24, 1959 |
| 874,968 | Great Britain | Aug. 16, 1961 |
| 885,467 | Great Britain | Dec. 28, 1961 |